United States Patent
Berkowitz et al.

(10) Patent No.: US 6,256,380 B1
(45) Date of Patent: Jul. 3, 2001

(54) METHODS FOR PROCESSING OPERATOR SERVICE SYSTEM CALLS

(75) Inventors: Renee Berkowitz, Englishtown; Wesley Downum, Holmdel, both of NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/233,659

(22) Filed: Jan. 19, 1999

(51) Int. Cl.$^7$ .................................................. H04M 3/00
(52) U.S. Cl. ............................................. 379/243; 379/221
(58) Field of Search .................................... 379/243, 244, 379/245, 219, 220, 221, 201, 207, 229

(56) References Cited

U.S. PATENT DOCUMENTS

| | | | |
|---|---|---|---|
| 5,448,632 | * 9/1995 | Iyob et al. | 379/201 |
| 5,539,817 | * 7/1996 | Wilkes | 379/230 |
| 5,684,866 | * 11/1997 | Florindi et al. | 379/114 |
| 5,805,689 | * 9/1998 | Neville | 379/220 |
| 5,999,603 | * 12/1999 | Lo et al. | 379/127 |
| 6,128,377 | * 10/2000 | Sonnenberg | 379/220 |

* cited by examiner

Primary Examiner—Ahmad Matar
Assistant Examiner—Benny Q. Tieu
(74) Attorney, Agent, or Firm—Joseph Giordano

(57) ABSTRACT

To distinguish multiple operator services systems (OSS) and provide services within a single local area telephone network, originating end telephone offices include database tables that correlate end user telephone numbers to selected OSS providers. When an OSS-type call is placed to an originating end office (OEO), the OEO uses the database to correlate the calling party's number to a code corresponding to the OSS provider. In one embodiment, this code is used to populate at least part of the ISUP called party number digit field of the SS7 signaling protocol. This number, as well as the original called party number are transmitted to the switching network which relies on the called party number digits field to route the call to the appropriate OSS.

3 Claims, 2 Drawing Sheets

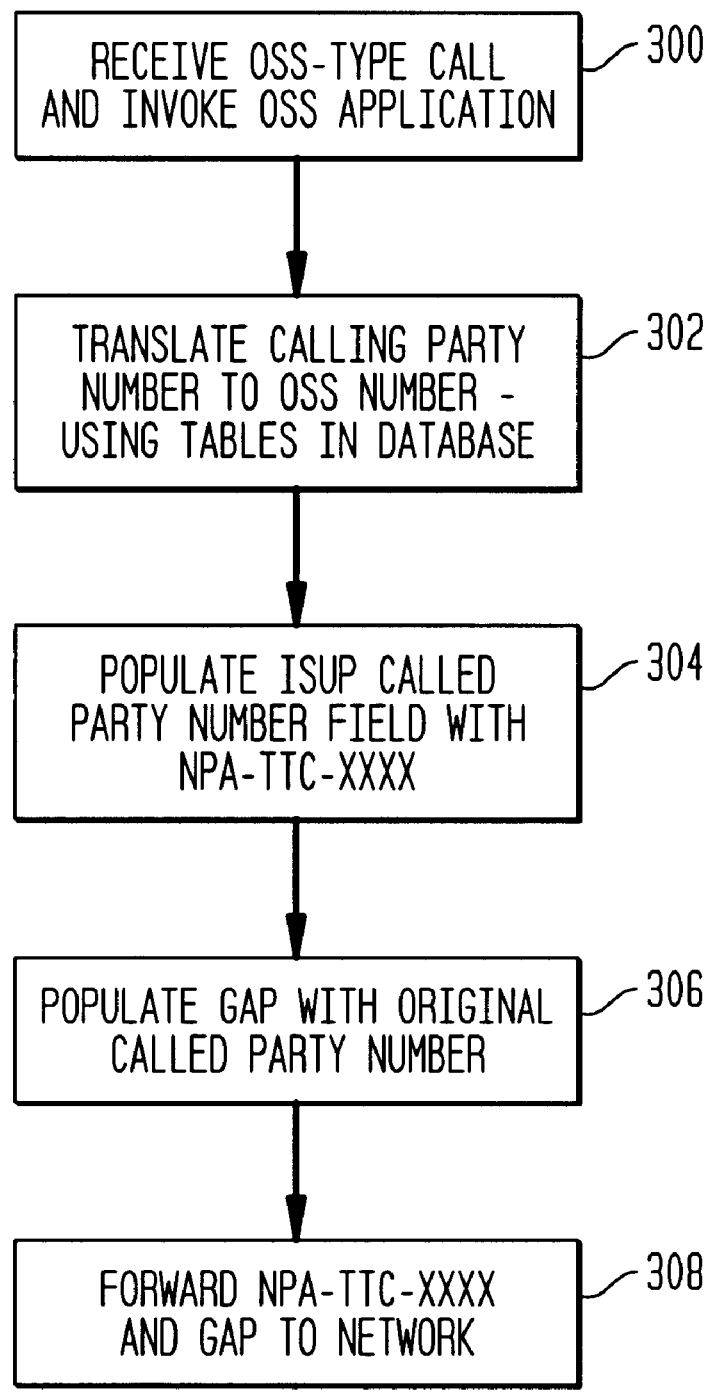

METHODS FOR PROCESSING OPERATOR SERVICE SYSTEM CALLS

FIELD OF THE INVENTION

This invention relates to the provision of operator services system calls in a telephone network.

BACKGROUND OF THE INVENTION

Today's telephone network provides for Operator Services Systems (OSS) to support and assist callers. The traditional Local Exchange Carrier (LEC) OSSs include 0+/alternate billing services, such as calling card services, directory assistance, 0−/assistance, 0−/emergency services, 1+coin sent paid, Intercept service, and 1+hotel/motel calls that require real-time rating. A caller typically invokes an operator service by dialing certain digits or by placing calls from certain stations, such as coin stations or hotel/motel stations. For example, a calling party dials 0 to ask for operator assistance, "411" to ask for directory assistance, or 0+NPA-NXX-XXXX to ask for alternative billing (e.g., calling cards or collect calls).

When a caller dials a specific number, such as 0−, 411, or any number of the form 0+NPA-NXX-XXXX, or when a caller dials any number from certain specific stations, such as coin or hotel/motel, the Originating End Office (OEO) switch that serves the calling number routes the call to the OSS designated by the caller's local service provider. Thus, the OEO owner does not have a choice of OSS providers.

Today's telephone network elements communicate call setup signals in accordance with the Signaling System 7 (SS7) Integrated Digital Network User Part (ISUP) call setup-associated protocol. ISUP, however, does not provide procedures enough to enable an intermediate switch to route local operator services calls to select a particular OSS based on the caller's local service provider and the operator service being requested. The basic call setup ISUP protocol places the called party number (i.e., the dialed digits) into the ISUP Called Party Number parameter digits field. In addition, the ISUP protocol fills the OEO parameter "Nature of Address" (NOA) field with an "operator requested" codepoint when '0' is dialed, and with a different codepoint other than an "operator requested" codepoint when '0' is not dialed. Intermediate switches in the network may only use the contents of the Called Party Number parameter, which includes a digits field and the NOA field, to route the call to the OSS. With the current basic call setup ISUP protocol, the intermediate switches can route these calls to only a single OSS, but have no way of selecting among multiple OSSs and routing to a selected one of them. Alternative methods of routing the calls to new OSSs, which compete with existing OSSs for operator services, may require more network facilities and resources.

Therefore, it is desirable to have methods and systems to overcome the disadvantages to operator services signaling in telephone networks.

SUMMARY OF THE INVENTION

Accordingly, the present invention is directed to systems and methods that substantially obviate one or more of the problems due to limitations and disadvantages of the prior art.

In accordance with the purposes of the invention, as embodied and broadly described, the invention comprises a telephone network element, comprising a database storing information correlating end users to selected operator service systems (OSS), means for receiving an OSS-type call, means for accessing said database to identify a code correlating the OSS-type call to a selected OSS, and means for transmitting said code to a network switch.

In another aspect, the invention comprises a method of processing OSS calls in an SS7 based telephone network, comprising the steps of correlating a calling party number to a six digit number identifying a preselected OSS, populating the ISUP Called Party Number field of the SS7 protocol with said six digit number and four additional digits, and transmitting the populated ISUP Called Party Number field to a network switch.

In another aspect, the invention comprises a method of processing OSS telephone calls, comprising the steps of correlating a calling party number to a routable number identifying a preselected OSS, populating a preselected field of a signaling protocol data string with said routable number, and transmitting said populated, preselected field to a telephone switch for routing to said preselected OSS.

The above description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BRIEF DESCRIPTION OF THE DRAWINGS

FIG. 3 is a flow process diagram for an OSS service in accordance with one embodiment of the present invention.

DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
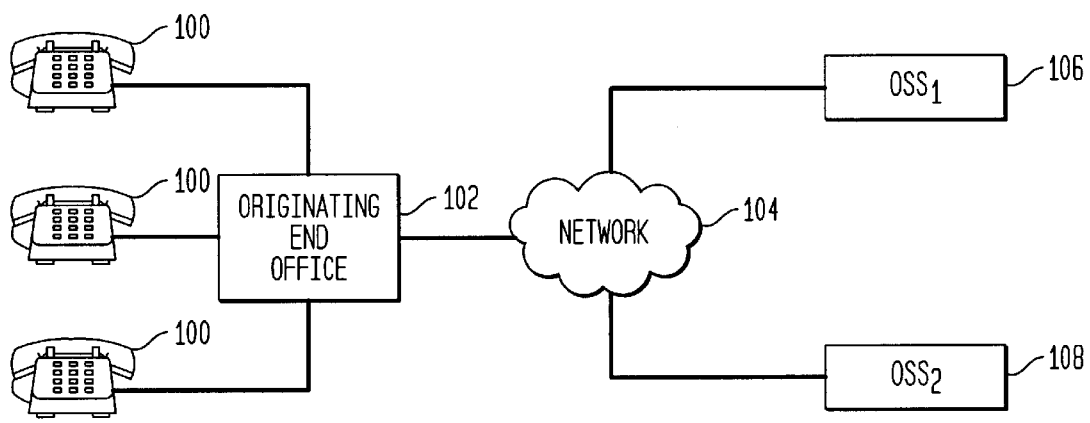
FIG. 1 is a block diagram of a telephone network including OSS capabilities.

FIG. 1 is a block diagram of a telephone network in accordance with one embodiment of the present invention. The network includes multiple end user telephones 100 connected to an originating end office OEO 102. The OEO 102 provides local telephone service for the end users 100. The OEO 102 is connected to the switching network 104. $OSS_1$ 106 and $OSS_2$ 108 connect to the switch network 104 and provide the operator services for the end users 100. Under the conventional SS7 signaling protocol, network 104 is incapable of distinguishing between $OSS_1$ 106 and $OSS_2$ 108. With the present invention, however, $OSS_1$ 106 and $OSS_2$ 108 can each provide service to end users 100 with network 104 being capable of distinguishing between the two OSSs and routing to them properly.

Figure 2:
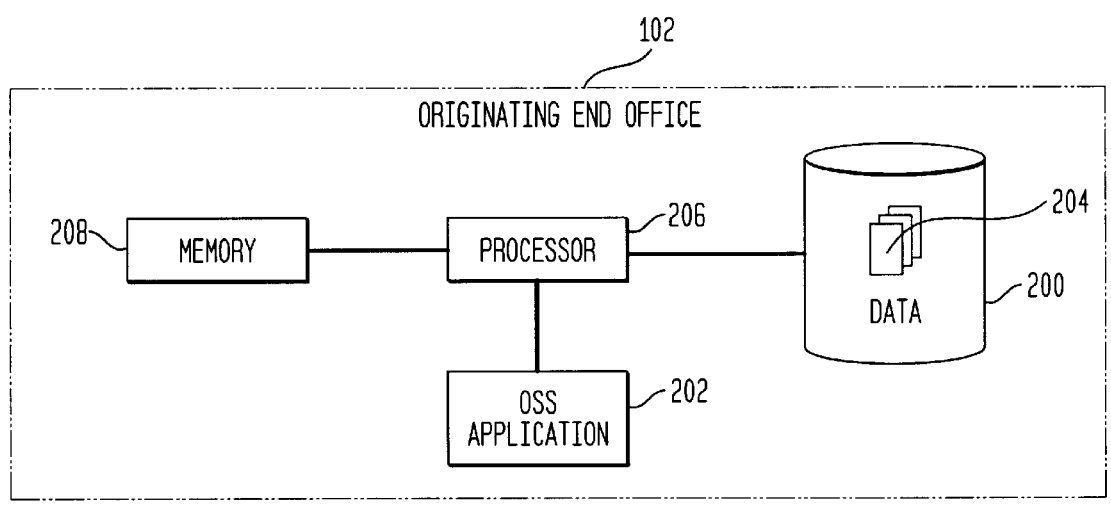
FIG. 2 is a block diagram of an end office in accordance with one embodiment of the present invention.

FIG. 2 is a block diagram of an OEO 102 in accordance with the present invention. OEO 102 in a preferred embodiment includes the structure and features of a conventional local exchange carrier OEO. In accordance with the present invention, however, additional structure and/or features are included, including a database 200 and OSS application 202, either of which can be internal or external to the OEO. Database 200, which alternatively need not be separate, but may be incorporated into any existing OEO database, includes tables 204. An OEO enables multiple local service providers to provide local services to end users in a geographic region. Each local service provider may contract with different OSS providers. Thus, tables 204 correlate a user to an OSS provider. In particular, one table correlates each end user's calling party number to its local service provider. A second table correlates the local service providers to their respective OSS providers. For example, consistent with the present invention, user one may subscribe to local services from service provider A, while user two subscribes to local services from service provider B. service provider A may contract OSS services from $OSS_1$ 106, while service provider B contracts OSS services from $OSS_2$ 108. The tables 204 in database 200 identify this correlation. Moreover, each local service provider may contract with different OSS providers depending on the type of operator service needed. Tables 204 also provide this correlation.

In a preferred embodiment the OSSs are identified by a six digit identifying number NPA-TTC. As described below, the switch network 104 will use this six digit number to route the calls to the appropriate OSS.

OEO 102 also includes OSS application 202 which utilizes the data in tables 204 to implement the features of the present invention. OSS application 202, which preferably includes a software application is executed by a processor 206 and a corresponding memory 208.

FIG. 3 is a flow diagram of the processing operation performed by processor 206 in accordance with OSS application 202 and database 200, in accordance with one embodiment of the present invention.

Initially, an end user 100 dials an OSS-type call, which is received by the end user's OEO 102. An OSS-type call includes any conventional OSS-type call, including "0," "411," "911," credit card based calls, hotel/motel calls, and coin calls. In accordance with the present invention, other types of operator services calls are contemplated and can be accommodated by the present invention. The OEOs are programmed to recognize such calls. Thus, referring to FIG. 3, when an OSS-type call is received at the OEO, the OEO initially invokes OSS application 102 (step 300). OEO, under control of the OSS application, then reads the end user's calling number and, referring to the tables 204 stored in database 200 translates the calling number to the caller's local service provider and then to the appropriate OSS provider, i.e., the appropriate six digit OSS number (step 302). In accordance with a preferred embodiment of the invention, the process then populates the ISUP called party number parameter digits field with the six digits corresponding to the OSS (NPA-TTC), plus four additional digits (XXXX) (step 304). The NPA-TTC codes are provided in the Local Exchange Routing Guide LERG. The conventional ISUP called party number is a ten digit number. The OSS number (NPA-TTC) preferably comprises the first six digits of this ten digit string. The additional four digits can be populated with any digits XXXX, which may or may not relate to the type of OSS service requested. In one embodiment, for example, these digits may simply be dummy digits to complete the ISUP called party number field. In an alternative embodiment, however, these four digits may include relevant information to the OSS call, including, e.g., a four digit code specifying the type of operator service requested by the calling party.

In one embodiment of the invention, the process then places the original called party number in a generic address parameter GAP of the SS7 protocol string (step 306).

The process then forwards the NPA-TTC-XXXX and GAP field to the network switches 104 for routing (step 308).

The information in the SS7 protocol string is then received by the switches in network 104. These switches read the NPA-TTC-XXXX string and route, in a preferred embodiment, on the first six digits. The receiving OSS, for example, $OSS_1$ 106 in FIG. 1, receives the information and can verify, based on the NPA-TTC-XXXX number that it is the proper OSS to process the call. In addition, the OSS can read the GAP field to learn the called number originally dialed by the end user. This tells the OSS the type of operator service call and may provide call completion information to the OSS. Also, in an alternative embodiment, the OSS can use the additional digits XXXX in the NPA-TTC-XXXX string as additional useful information to process the OSS call.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method of processing operator services system calls in a signaling system 7 (SS7) based telephone network including a switching network, a plurality of end user telephones, a plurality of end office switches and a plurality of operator services systems, comprising the steps of:

invoking operator services processing in one of the end office switches connected to one of the end user telephones;

in response to invocation of operator services processing by the one end user telephone, translating, at the end office switch, a telephone number associated with the one end user telephone to a six-digit operator services system code;

populating, at the end office switch, an integrated services digital network user part (ISUP) called party number field of an SS7 protocol message with the six-digit code and four additional digits;

populating, at the end office switch, an ISUP generic address parameter field of the SS7 protocol message with the digits dialed during invocation of operator services by the one end user telephone; and transmitting the called party number field and the generic address parameter field in the SS7 protocol message to the switching network.

2. The method according to claim 1 wherein the step of translating the telephone number associated with the one end user telephone to the six-digit operator services system code further comprises the steps of:

translating, at the end office switch, the telephone number associated with the one end user telephone to a local service provider identifier associated with the one end user telephone; and translating, at the end office switch, the local service provider identifier associated with the one end user telephone to the six-digit operator services system code.

3. The method according to claim 1 wherein the four additional digits identify a type of operator service requested.

* * * * *